United States Patent [19]

Monsheimer et al.

[11] 3,966,551

[45] June 29, 1976

[54] METHOD FOR PREPARING TANNABLE PELTS FROM ANIMAL SKINS AND HIDES

[75] Inventors: Rolf Monsheimer, Darmstadt-Eberstadt; Ernst Pfleiderer, Darmstadt-Arheilgen, both of Germany

[73] Assignee: Rohm GmbH, Darmstadt, Germany

[22] Filed: Jan. 28, 1975

[21] Appl. No.: 544,794

[30] Foreign Application Priority Data

Feb. 1, 1974 Germany ............................ 2404789

[52] U.S. Cl. ........................................................ 195/6
[51] Int. Cl.$^2$ ............................................... C12B 1/00
[58] Field of Search .................... 195/5, 6; 8/94.1 A, 8/94.16, 94.18

[56] References Cited

UNITED STATES PATENTS

| | | | |
|---|---|---|---|
| 2,041,731 | 5/1936 | Wallerstein et al. | 195/6 |
| 2,988,488 | 6/1961 | Robison et al. | 195/6 |

*Primary Examiner*—A. Louis Monacell
*Assistant Examiner*—R. B. Penland
*Attorney, Agent, or Firm*—Curtis, Morris & Safford

[57] ABSTRACT

In a process for the preparation of tannable pelts from animal skins or hides wherein concurrent soaking, unhairing, opening up of the hide structure, and bating are effected in a single procedural step by treatment with enzymes in an aqueous bath containing enzymes, the improvement wherein the enzymatic treating bath is free of amines and comprises dissolved therein:

a. an effective amount of at least one member selected from the group consisting of a fungus protease whose optimum efficacy towards casein is at a pH above 7.0, trypsin, papain, and a bacterial protease whose optimum efficacy is at a pH between 6 and 9;

b. an effective amount of a bacterial protease having an optimum efficacy against hemoglobin at a pH above 9; and c. an effective amount of thioglycolic acid or a salt thereof.

3 Claims, No Drawings

METHOD FOR PREPARING TANNABLE PELTS FROM ANIMAL SKINS AND HIDES

The present invention relates to an improved method for preparing tannable pelts by treating animal skins and hides with a proteolytic enzyme, in the presence of an activator, whereby soaking, unhairing, opening up of the hide structure, and bating are effected in one operational step.

It is known in the art that skins and hides are only very seldom treated in a tannery directly after slaughter as so-called "green" hides. In general, they are first preserved, most usually by salting, so that they can be stored in bundles and, if necessary, can be transported over large distances without being attacked by putrefaction. The salted and dried raw hides are treated in the beamhouse, i.e. at first by soaking, in order to return them into the condition of the original green hides. After soaking, hair loosening takes place in a separate bath using an enzymatic process. Thereafter, dehairing follows by machine stripping of the hair from the grain. In a subsequent alkaline liming, the skin substances forming the leather are swollen and the hide structure is thereby opened for tanning. At the same time, by the addition of a reducing substance such as sodium sulfide, sodium sulfhydrate, and the like, for example, residual hair roots and short hairs are jellified. In the swollen condition, the sub-dermal connective tissue is removed by machine from the flesh side. On deliming and bating, neutralization occurs whereby, by a decrease in swelling, the swollen skin again reaches its natural hydration state and proteinaceous materials which have not yet been removed, such as albumin, globulin, melanine, keratin, procollagen, tropocollagen, and mucopolysaccharides, which can unfavorably influence the quality of the leather and which are, in technical terminology, referred to as "scud", can be removed.

Since the discovery by Otto Roehm that hides could be bated under the influence of an aqueous extract of the pancreas (German Pat. No. 200,519, granted in 1907), enzymes have found extensive use in the conversion of hides and skins into pelts ready for tanning, beginning with the soaking process, continuing through unhairing, opening of the hide structure, and bating. In the soaking process, proteolytic enzymes promote rehydration by decomposition of the aforementioned unstructured proteins.

In choosing a unhairing process, the question of whether the hair is to be chemically destroyed or should be retained is of decisive significance. In a lime-painting operation, i.e. the application of a lime-sodium sulfide slurry onto the hair side of a spread skin, in lime-sulfur-sodium pit liming, and also in the so-called sulfide-free liming, the hair is completely destroyed, whereas the hair is as a rule not destroyed in enzymatic unhairing. With lime-painting and also with the use of lime and alkali sulfide in subsequent liming, in contrast with enzymatic unhairing, there is a loading of the drainage canal with sulfide-containing waste waters as well as with waste waters having a high biological oxygen demand, so that for this reason alone enzymatic treatment is to be preferred. The efficacy of proteolytic enzymes depends on a loosening of the basal layer of the epidermis as well as of the underlying hair roots. The hair or wool must be removed from the skins or hides mechanically after conclusion of the enzyme treatment. Until recently, it has not been possible to remove the short hairs completely from hides or skins during enzymatic unhairing. Rather, they were removed during the subsequent opening of the hide structure which usually takes place under alkaline conditions.

In the prior art, the unhaired and limed pelts are subsequently neutralized and bated, whereby the skin, which has been swollen by the alkaline liming process, should be returned again to its natural hydration condition. Because of the so-called "swelling hysteresis" of the skin, it is not possible during neutralization completely to overcome the swelling caused by liming. More often, a bating process usually proceeding under the influence of proteolytic enzymes is required.

Enzymes develop their efficacy, as is known in the art, in various definite pH regions. As described in German Pat. No. 927,464, enzymatic soaking can take place in the acid region or, according to German Pat. No. 2,059,453, in a strongly alkaline region. A requirement in both cases is, naturally, a choice of such proteolytically active enzymes whose maximum efficacy lies in the acid or alkaline region.

Also in unhairing, one may work in the acid or the alkaline region by a corresponding choice of the proteolytic enzymes to be employed. To the extent that hides to be unhaired are treated with enzymes in a weakly acid to weakly alkaline medium, say in a pH region between 5 and 9, special precautions must be taken in order to prevent an undesirable growth of bacteria in the bath or on the skins. According to the process in German patent publication 1,800,891, this disadvantage is overcome by working in a strongly acid region and employing pepsin or papain, for example, as the proteolytic enzymes. It must, however, be mentioned that an exclusively enzymatic unhairing in the treatment of cattle hides has not been possible because the action of fungus proteases in the acid region does not give pelts free of short hair. However, when treatment is carried out with proteases which are effective in a pH region greater than 10, the grain of the skin is attacked, resulting in the development of a suede effect or even to a dissolution of the grain with the formation of pits in the flanks.

Proteases whose optimum efficacy is in the alkaline region, namely at a pH value greater than 9, have only acquired considerable technical significance in the last few years. The preparation and use of such "alkaline proteases" is described in U.S. Pat. No. 3,723,250 granted Mar. 27, 1973. In this publication, the use of proteolytic enzymes in unhairing agents is disclosed, as well as the use of such enzymes in washing agents, agents for washing dishes, and the like.

In order to achieve satisfactory results in the preparation of tannable pelts from optionally salted raw skins according to the previous state of the art, it was necessary to carry out the beamhouse operations in succession, and in each case under certain definite pH conditions and with a choice of various optimally effective proteolytic enzymes. If soaking and liming, on the one hand, and neutralization and bating, on the other hand, can occasionally overlap, alkaline liming and neutralizing or acid bating and a corresponding use of "alkaline" proteases in one case and of "acid" proteases in the other case have generally been processes clearly separated one from the other. Until recently, no process has been known in which soaking, unhairing, opening up of the hide structure, and bating could take place in a single process, that is in a single drum or in a mixer under the influence of the same enzyme mixture.

However, commonly-owned copending U.S. patent application Ser. No. 432,086 filed Jan. 9, 1974 teaches that tannable pelts can be prepared under the influence of proteolytic enzymes on animal skins and hides in one operation involving soaking, unhairing, opening up of the hide structure, and bating if raw hides, free of preserving salt by washing, are treated in a drum or mixer with an aqueous bath, adjusted to a pH value between 9 and 12, containing the following substances:

a. at least one member selected from the group consisting of a fungus protease whose optimum efficacy towards casein lies at a pH value greater than 7.0, trypsin, papain and a bacterial protease whose optimum efficacy is at a pH between 6 and 9;

b. a bacterial protease having an optimum efficacy against hemoglobin at a pH greater than 9; and c. a short-chained, primary or secondary aliphatic amine.

In a preferred embodiment of the aforementioned prior invention, a small amount, from 0 to about 1 percent by weight of the hides being treated, of a sulfur-containing reducing agent has been added to the treating bath, e.g. mercaptans such as thioethanol, thiopropanol, thioglycolic acid and its salts, thiourea, or cystine hydrochloride.

According to the present invention, it has been found that the one-step process described above can be carried out with at least the same good results, and with better results in most cases, if the amine component (c) used to activate the proteases, is omitted and is replaced by thioglycolic acid or its salts. Since the latter are sulfur-containing reducing agents, no further compounds of this type need be added to the treating baths.

It must be considered surprising that thioglycolic acid and its salts activate the alkaline proteases in the pH region of 6 to 9 to such a degree that all amine additives can be dispensed with. [F] Since the aforementioned process is carried out in an alkaline treating bath, wherein a pH range of 9.0 – 12.0 is established by the use of sodium hydroxide or hydrated lime, and advantageously by the addition of a mixture of these two alkalinizing agents, it is evident that if free thioglycolic acid is added it is the salts of the acid which activate proteases present in the bath.

[F] Thus, the unpleasant smell of the amines is avoided in the process of the invention. Further, the omission of the amine component from the baths of the aforementioned process reduces the cost of treatment.

As in the invention described in Ser. No. 432,086, for component (a), fungus proteases of the type under consideration are obtained, for example, as soluble enzyme complexes together with amylase, cellulase, and various glycosidases as accompanying enzymes from Aspergillus cultures, particularly from cultures of *Aspergillus niger* or *Aspergillus flavus*. The aforementioned fungus proteases may be replaced in whole or in part with trypsin and/or papain and/or by a bacterial protease whose maximum efficacy against casein lies at a pH from 6 to 9. Such bacterial proteases are formed, for example, by *Bacillus subtilis* of the Mesentericus group, by *Bacillus natto*, *Streptomyces griseus*, *Bacillus cereus*, and *Bacillus mycoides*.

For component (b), the preparation of bacterial proteases which are maximally effective in a more strongly alkaline region is described in extensive detail in aforementioned U.S. Pat. No. 3,723,250. In German patent publication No. 1,811,000, the formation of proteases optimally effective in the alkaline region from the bacterial organism *Bacillus subtilis*, as well as from certain Streptomyces types is described. According to German patent publication No. 1,807,185, the strain of *Bacillus alcalophilus* also produces proteases whose activity maximum lies in the aforementioned alkaline region. The protease complexes prepared from *Bacillus subtilis* have proved to be particularly advantageous. The alkaline bacterial protease is used, calculated on an enzyme product with 100,000 LVU, in quantities from about 0.01 to 0.3 percent. The alkaline fungus protease, or the enzyme chosen in its place — also employed as an enzyme product with 100,000 LVU — is used in quantities from 0.02 to 0.5 percent. The percentages given are by weight of the salted hides.

The bath frequently contains sodium sulfate previously blended with the enzymes to facilitate dosing of the latter.

As to the amount in which the fungus protease and bacterial protease of the aforementioned types can be employed, it is mentioned that this depends on the provenance and condition of the skins and hides to be treated. Although the amount varies over wide limits, it nevertheless can be determined by preliminary testing that can be easily carried out. It has in every case proved to be advantageous to use the fungus protease in an amount which predominates over the bacterial protease, for example in a ratio of 3:1, using the enzymatic efficacy of the two protease types as a measure for the amount to be employed. The aforementioned is true also if the fungus protease is in part or entirely replaced by trypsin, papain, and/or by a bacterial protease whose optimum efficacy is at a pH between 6 and 9.

The enzymatic efficacy of all proteases used is determined by one particular method, preferably according to Loehlein-Vollhardt (Collegium 1932, p. 404, Gerbereichemisches Taschenbuch by A. Kuenzel, 1955, p. 85).

As is known in the art, the activity of proteincleaving enzymes is determined by different methods. The best known methods are the Anson-hemoglobin method and the aforementioned Loehlein-Vollhardt method employing the hydrolytic decomposition of casein. In the first case, a protease unit (AU) is defined as that amount of enzyme which decomposes hemoglobin under certain given standard conditions with such an initial velocity that such an amount of decomposition products which cannot be precipitated with trichloroacetic acid is released per minute as gives the same color intensity as one milli-equivalent of tyrosine with phenol reagent.

The Loehlein-Vollhardt unit (LVU) is defined as that amount of enzyme which digests 1.725 mg of casein under the test conditions established for this method. Both methods are suitable for determining the activity of the fungus proteases and bacterial proteases to be used according to the invention.

The amount of thioglycolic acid or its salts employed also depends on the kind of the skins and hides to be treated and can, thus, vary between wide limits. For example, in the treatment of calfskins, an amount of thioglycolic acid of 0.05 percent, calculated on the weight of the raw skins, is sufficient to give a pelt free of short hairs. However, for example, when naturally-hard salted buffalo hides are treated, it may be necessary to use 1.0 percent of the thioglycolic acid or an equivalent amount of a thioglycolate.

The following examples, describing the treatment of different kinds of skins and teaching exemplary amounts of agents in the treating bath, make it easy to determine the optimal composition of the bath in any given case after a few simple orienting tests. It should be stressed that, in the present process, just as in the aforementioned one-step prior art process, the hair is not destroyed and can be separated from the waste water on draining the drum or mixture by simply using a sieve.

A better understanding of the present invention and of its many advantages will be had by referring to the following specific examples, given by way of illustration. The percentages mentioned in the Examples are referred to the weight of the salted hides.

EXAMPLE 1

100 kg of salted calfskins are washed for one hour in a drum with 200 percent of water at 25°C. with occasional moving.

The washed skins are then treated for 5 hours in a bath comprising:

50 percent of water, 30°C.;

0.023 percent of an alkaline bacterial protease from *Bacillus subtilis* (77,000 LVU);

0.025 percent of alkaline mold fungus protease from *Aspergillus niger* (140,000 LVU);

0.02 percent of trypsin (250,000 LVU);

0.2 percent of thioglycolic acid (80 percent, technical);

0.5 percent of sodium hydroxide, priorly dissolved in a five-fold amount of cold water.

The drum is turned for 5 minutes every half hour.

A pH value of 11.4 is established in the bath which, after 5 hours, is 10.5.

The 1 percent of sodium hydroxide, previously dissolved in a five-fold amount of cold water, and 1.0 percent of calcium hydroxide are added and the contents are moved for 60 minutes. After 30 minutes, 100 percent of water at 30°C. is added and the mixture is stirred again for 30 minutes.

The total treating time amounts to 20 hours. During the rest times, the hides are moved for a period of 5 minutes every 3 hours at 4 revolutions per minute.

The pelts obtained after fleshing are completely unhaired, have a medium degree of swelling, and have shallow fat wrinkles.

EXAMPLE 2

100 kg of salted black cowhides are introduced into a drum and are there combined with 200 percent of water at 25°C.

After standing for 30 minutes, the hides are moved for 30 minutes. The bath is then discarded.

For the enzyme treatment, the following materials are added and the hides are moved for 30 minutes:

200 percent of water with an initial temperature of 28°C.;

0.023 percent of alkaline bacterial protease from *Bacillus alcalophilus* (77,000 LVU);

0.025 percent of alkaline mold fungus protease from *Aspergillus flavus* (140,000 LVU);

0.02 percent of trypsin (250,000 LVU);

0.8 percent of ammonium thioglycolate;

1 percent of sodium hydroxide, priorly dissolved in a ten-fold amount of cold water.

The hides remain in this bath overnight and during this time are moved often for five-minute periods.

The pH value of the bath is initially 10.8 and is 9.8 the following morning.

To the same bath, 1.0 percent of hydrated lime and 2.0 percent of sodium hydroxide, the latter priorly dissolved in a ten-fold amount of cold water, are now added and moving is continued for 40 minutes.

The total treating time is 36 hours.

After this time the skins are free of hair. They are soft and sufficiently swollen. Scud is so well loosened that it can be removed by moving during de-liming.

EXAMPLE 3

100 kg of dried salted sheepskins are introduced into a drum and are there treated for 3 hours at two revolutions per minute with:

500 percent of water, 40°C.;

5.0 percent of sodium chloride;

0.115 percent of alkaline bacterial protease from *Streptomyces spec.* (77,000 LVU);

0.33 percent of alkaline mold fungus protease from *Aspergillus niger* (140,000 LVU);

0.1 percent of trypsin (50,000 LVU);

1.0 percent of thioglycolic acid (60 percent); and 1.5 percent of sodium hydroxide, priorly dissolved in a five-fold amount of cold water.

After this time, 4.0 percent of hydrated lime and 6.0 percent of sodium hydroxide, the latter priorly dissolved in a ten-fold amount of cold water, are added and the skins are moved for a further 2 hours at 10 rpm.

Thereafter, 500 percent of water at 30°C. is added and the skins are stirred for another 30 minutes at 10 rpm.

The total treatment time was 22 hours, during which it is suitable to move often for five-minute intervals.

The pelts obtained are clean, free of short hairs, and show no grain contraction.

EXAMPLE 4

100 kg of salted black- and colored-cowhides are introduced into a mixer and combined with 70 percent of water. After standing for 30 minutes, they are moved for 10 minutes and are left to stand for one hour before they are moved again. Subsequently, the liquid is drained.

Enzyme treatment follows by the addition of:

50 percent of water having a temperature of 30°C. when introduced;

0.023 percent of alkaline bacterial protease from *Bacillus subtilis* (77,000 LVU);

0.04 percent of trypsin (250,000 LVU);

0.1 percent of sodium carbonate (calcined);

0.2 percent of thioglycolic acid (80 percent, technical); and 0.5 percent of caustic soda priorly dissolved in a five-fold amount of water.

Moving takes place for 10 minutes.

Treatment in this bath takes 5 hours with turning every ½ hour for 5 minutes. The pH value at the beginning is 11.3; after 5 hours it is 10.5.

At this point 1 percent of caustic soda, priorly dissolved in a five-fold amount of water, and 3 percent of calcium hydroxide are added and the hides are moved for 60 minutes.

After 30 minutes' standing, 50 percent of water at 30°C. is added. Then the hides are moved again for 30 minutes.

The percentages given are based on the weight of the salted hides.

EXAMPLE 5

100 kg of red salted calfskins were washed with 200 percent of water for one hour with occasional moving. Enzyme treatment in a drum followed by the addition, and moving for ten minutes, of:

40 percent of water (30°C. at introduction);

0.046 percent of alkaline bacterial protease from *Bacillus subtilis* (77,000 LVU);

0.08 percent papain (50,000 ASU);

0.1 percent of sodium carbonate (calcined);

0.8 percent of ammonium thioglycolate (technical); and 0.5 percent of caustic soda priorly dissolved in a five-fold amount of water.

Every half-hour the hides were moved for 5 minutes.

The pH at the beginning was 11.2. After 5 hours, the pH was 10.8.

1.0 percent of caustic soda, priorly dissolved in a five-fold amount of water, and 1.5 percent of calcium chloride were now added and the hides were moved for 30 minutes. After 30 minutes' standing, a further 160 percent of water at 30°C. is added.

After further stirring for 30 minutes, the hides are treated for an additional 12 hours.

During this time, the skins should be moved several times for 3 – 5 minutes.

The percentages given pertain to the weight of the salted hides.

The fleshed hides show a low degree of swelling and thus have an above-average area yield.

EXAMPLE 6

100 kg of salted bull hides are coated with 200 percent of water and slowly moved for 1 hour. After draining the bath, the skins are next moved for 10 minutes with the following:

30 percent of water (30°C. at introduction);

0.046 percent of alkaline bacterial protease from *Bacillus subtilis* (77,000 LVU);

0.133 percent of neutral bacterial protease from *Bacillus cereus* (100,000 LVU);

0.5 percent of sodium carbonate (calcined);

0.3 percent of thioglycolic acid (80 percent, technical); and 0.8 percent of sodium hydroxide solution (33 percent, diluted before addition with an equal amount of cold water).

The pelts remain in this bath for 5 hours and are moved every hour for 10 minutes. The pH of the bath at the beginning is 10.8; after 5 hours, the pH is 10.3. At this point, 3 percent of sodium hydroxide solution (33 percent, diluted before addition with the same amount of cold water) and 1.5 percent of hydrated lime are added.

The hides are moved for 60 minutes and subsequently left to stand for 30 minutes.

After the addition of 150 percent of water at 30°C., the hides are moved again for 30 minutes.

The pelts remain in this bath for a total of 16 hours.

The uniform removal of hair is improved by moving the hides briefly for 3 – 5 minutes several times.

The amounts and percentages given pertain to the weight of the salted hides.

The fleshed skin is soft-swollen and shows no grain contraction.

EXAMPLE 7

100 kg of salted calfskins are washed for 1 hour with 200 percent of water. A following enzyme treatment was carried out by moving the hides for 10 minutes in a bath comprising:

30 percent of water (30°C. when introduced);

0.023 percent of alkaline bacterial protease from *Bacillus subtilis* (77,000 LVU);

0.02 percent of papain (50,000 ASU);

0.02 percent of trypsin (250,000 LVU);

0.5 percent of sodium carbonate (calcined);

0.5 percent of sodium thioglycolate (technical); and 0.8 percent of sodium hydroxide solution (33 percent, diluted prior to addition with the same amount of cold water).

The skins are left in this bath for 5 hours and moved for 5 minutes at 30-minute intervals. The pH of the bath at the beginning is 10.9; after 5 hours, it is 10.1.

3.0 percent of sodium hydroxide solution (33 percent, diluted before addition with the same amount of cold water) and 2.0 percent of hydrated lime are added to the same bath. After moving for 60 minutes, the skins are left to stand for 30 minutes after which 150 percent of water at 30°C. is added.

Thereafter, the hides are moved once more for 1 hour.

During the remaining treatment time of 10 hours, the hides should be briefly moved often.

The percentage values are percents by weight of the salted hides.

The pelts obtained after fleshing have shallow fat wrinkles and are free of pigment and short hairs.

EXAMPLE 8

100 kg of salted cowhides are first washed for one hour in a drum with 200 percent of water at 20°C. The bath is then thrown out. Enzyme treatment followed with:

40 percent of water (30°C. as introduced);

0.023 percent of alkaline bacterial protease from *Bacillus subtilis* (77,000 LVU);

0.066 percent of neutral bacterial protease from *Bacillus cereus* (100,000 LVU);

0.04 percent papain (50,000 ASU);

0.3 percent of caustic soda (dissolved prior to addition in a five-fold amount of water); and 0.1 percent of thioglycolic acid (80 percent, technical).

The treatment time lasted 6 hours. Every half-hour, the hides are moved for 5 minutes. The pH value at the beginning of the process is 11.4; after 5 hours, the pH is 10.8.

Now, 1.0 percent of caustic soda, priorly dissolved in a five-fold amount of water, and 1.0 percent of hydrated lime are added and moved for 60 minutes. After 30 minutes, 100 percent of water at 30°C. is added and stirring is carried out for a further 30 minutes.

The percentages given are by weight of the salted hides.

The total treatment time amounts to 20 hours. During the standing periods, the hides are moved for 5 minute periods at 4 rpm in three-hour intervals.

The pelts obtained after fleshing are completely unhaired and have only a very small degree of swelling and shallow fat wrinkles. The low degree of swelling leads to a particularly advantageous area yield in the finished leather.

EXAMPLE 9

100 kg of salted calfskins are introduced into a concrete mixer and directly treated for 5 hours with 50 percent of water (30°C.);

0.023 percent of alkaline bacterial protease from *Bacillus subtilis* (77,000 LVU);

0.066 percent of neutral bacterial protease from *Bacillus cereus* (100,000 LVU);

0.020 percent of trypsin (250,000 LVU);

0.1 percent of sodium carbonate (calcined);

0.4 percent of thioglycolic acid (80 percent, technical); and 0.3 percent of caustic soda (priorly dissolved in a five-fold amount of water).

At the beginning, the hides are moved for 10 minutes and then for 5 minutes each half-hour.

The pH value at the beginning is 11.3; after 5 hours, it is 10.3.

1.0 percent of caustic soda, priorly dissolved in a five-fold amount of water, is now added together with 2.0 percent of hydrated lime and the mixture is moved for 60 minutes. After 30 minutes' standing, an additional 150 percent of water is added at 30°C. and the hides are moved for another 30 minutes.

The remaining treatment time is 13 hours. During this time, the mixture is moved several times for 5-minute intervals.

The percentages given pertain to the weight of the salted hides.

The pelts obtained are smooth and free of short hairs.

What is claimed is:

1. In a process for the preparation of tannable pelts from animal skins or hides wherein concurrent soaking, unhairing, opening up of the hide structure, and bating are effected in a single procedural step by treatment with enzymes in an aqueous bath containing enzymes, the improvement wherein the enzymatic treating bath is free of amines and comprises dissolved therein:

a. an effective amount of at least one member selected from the group consisting of a fungus protease whose optimum efficacy towards casein is at a pH above 7.0, trypsin, papain, and a bacterial protease whose optimum efficacy is at a pH between 6 and 9;

b. an effective amount of a bacterial protease having an optimum efficacy against hemoglobin at a pH above 9; and c. an effective amount of thioglycolic acid or a salt thereof.

2. A method as in claim 1 wherein the proteolytic activity of the fungus protease therein, measured in conventional units, is greater than that of the bacterial protease therein.

3. A method as in claim 1 wherein said fungus protease (a) is derived from *Aspergillus niger* or *Aspergillus flavus* and said bacterial protease (b) is derived from *Bacillus subtilis.*

* * * * *